(12) United States Patent
Tatzreiter

(10) Patent No.: US 9,958,092 B2
(45) Date of Patent: May 1, 2018

(54) DIAPHRAGM BELLOWS

(71) Applicant: VAT Holding AG, Haag (CH)

(72) Inventor: Wolfgang Tatzreiter, Dornbirn (AT)

(73) Assignee: VAT Holding AG, Haag (CH)

( * ) Notice: Subject to any disclaimer, the term of this patent is extended or adjusted under 35 U.S.C. 154(b) by 74 days.

(21) Appl. No.: 14/817,364

(22) Filed: Aug. 4, 2015

(65) Prior Publication Data
US 2016/0033061 A1    Feb. 4, 2016

(30) Foreign Application Priority Data

Aug. 4, 2014    (EP) .................................... 14002715

(51) Int. Cl.
| F16L 11/15 | (2006.01) |
| F16K 41/10 | (2006.01) |
| F16J 3/04 | (2006.01) |

(52) U.S. Cl.
CPC ............... *F16L 11/15* (2013.01); *F16J 3/047* (2013.01); *F16J 3/048* (2013.01); *F16K 41/10* (2013.01)

(58) Field of Classification Search
CPC ... F16J 3/048; F16J 3/047; F16J 11/15; F16K 41/10
USPC .................................................. 138/121, 30
See application file for complete search history.

(56) References Cited

U.S. PATENT DOCUMENTS

| 2,657,075 A * | 10/1953 | Schwester ............. F16L 51/029 138/121 |
| 3,124,502 A | 3/1964 | Radke |
| 4,183,289 A | 1/1980 | Jinnouchi |
| 4,650,160 A | 3/1987 | Smith |
| 4,674,911 A | 6/1987 | Gertz |
| 4,749,200 A | 6/1988 | Sehnal et al. |
| 6,076,557 A * | 6/2000 | Carney ................... F15B 1/103 138/30 |
| 6,485,007 B1 | 11/2002 | Duelli |
| 8,431,855 B2 * | 4/2013 | Margairaz ......... A61M 5/14276 219/121.63 |
| 2002/0175480 A1 | 11/2002 | Tatzreiter |
| 2007/0106280 A1 | 5/2007 | Utard et al. |

FOREIGN PATENT DOCUMENTS

| CN | 203363518 | 12/2013 |
| EP | 2177792 | 4/2010 |
| GB | 2062132 | 5/1981 |
| JP | 2013221596 | 10/2013 |

* cited by examiner

*Primary Examiner* — Craig Schneider
*Assistant Examiner* — David Deal
(74) *Attorney, Agent, or Firm* — Volpe and Koenig, P.C.

(57) ABSTRACT

In a diaphragm bellows, diaphragms that follow one another are welded together alternately in region of their inner and outer edges. At least one guide part is provided for guiding on a surface of a rod passing through an inner through-opening in the diaphragm bellows or of a tube surrounding the diaphragm bellows. The at least one guide part is made of sheet metal and has a holding portion which, in the case of guiding on a rod, is located, in a region of an outer edge, between adjacent diaphragms and is welded to the adjacent diaphragms and, in the case of guiding on a tube, is located, in the region of an inner edge, between adjacent diaphragms and is welded to the adjacent diaphragms. The holding portion is connected to a guide portion for guiding on the surface of the rod or of the tube.

23 Claims, 6 Drawing Sheets

Fig. 1
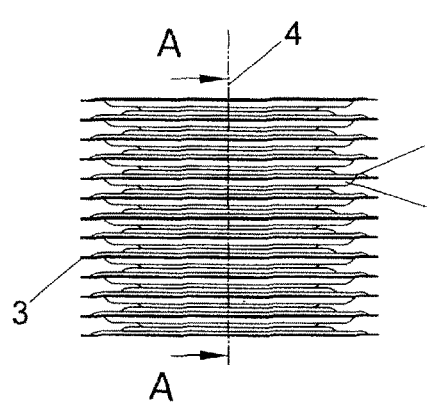
Fig. 2
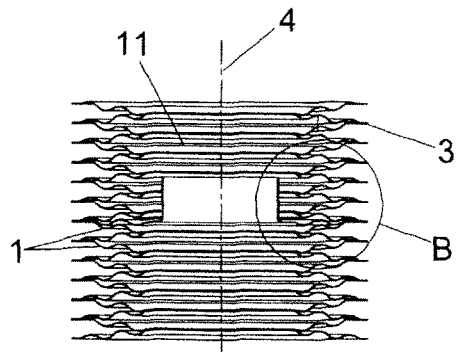
Fig. 3
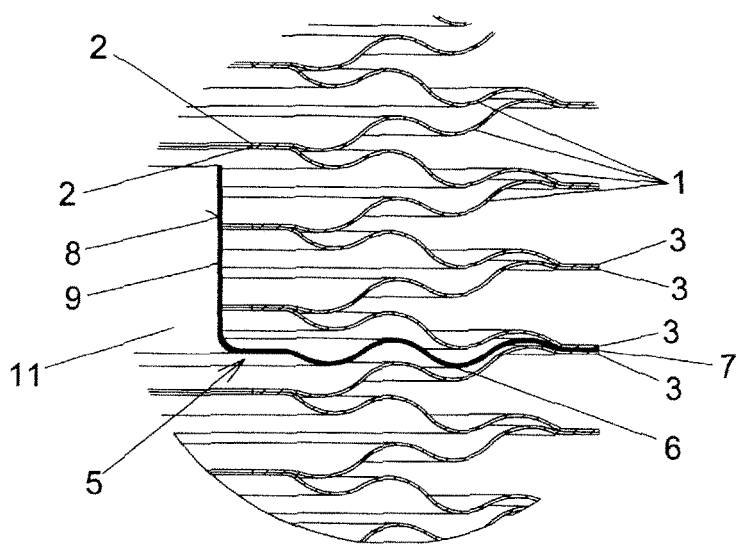
Fig. 4
Fig. 5
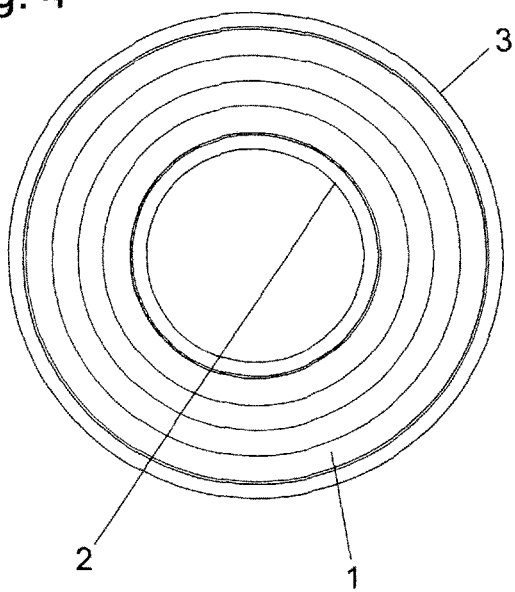

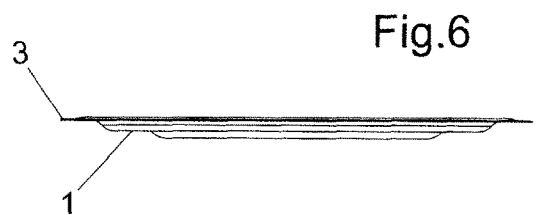
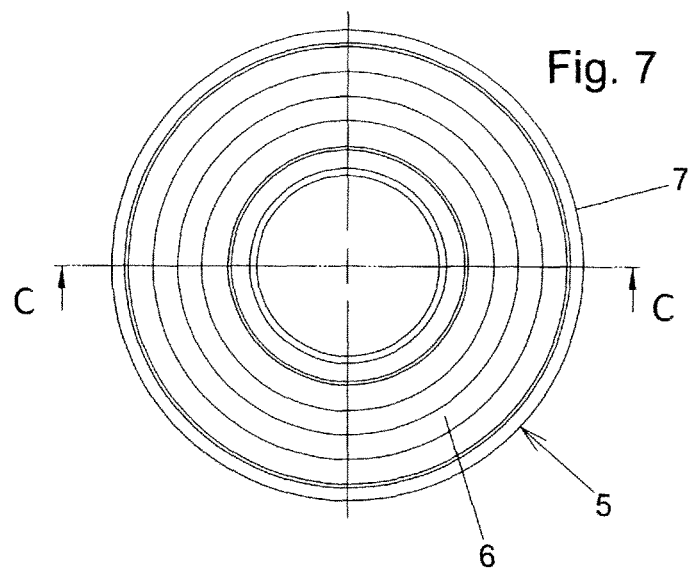
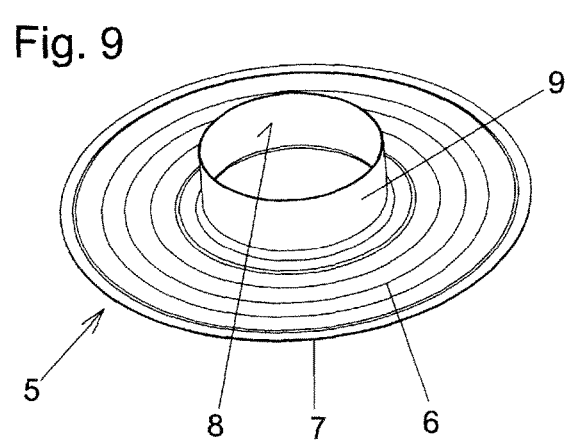
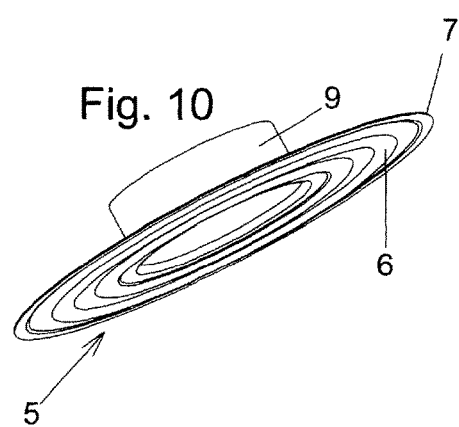
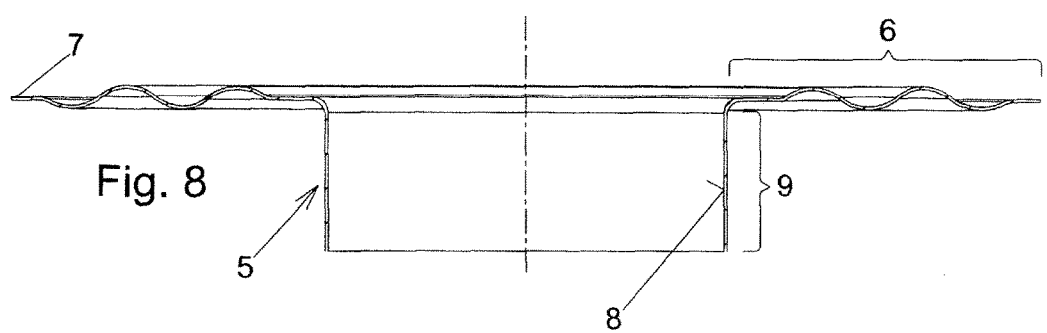

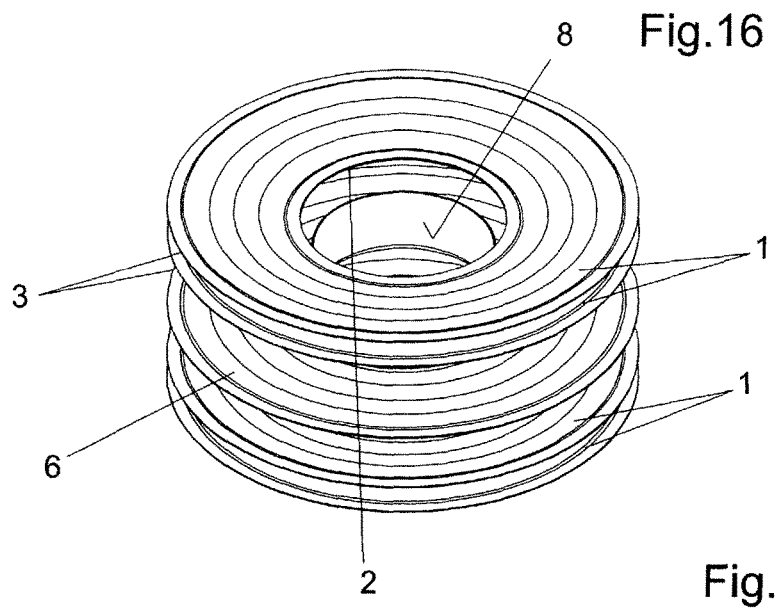
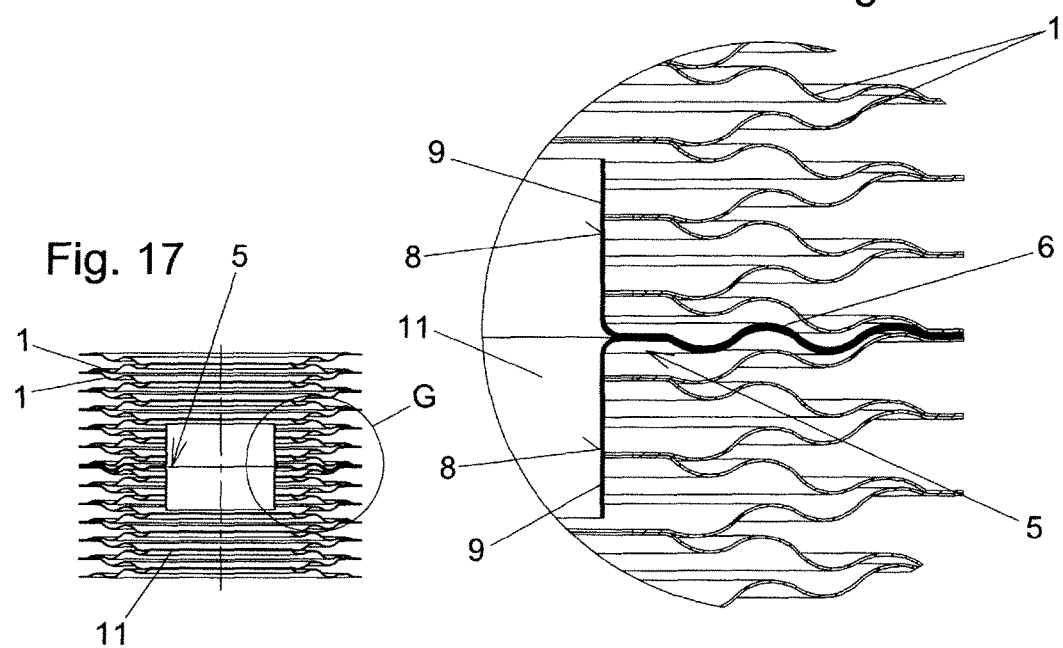
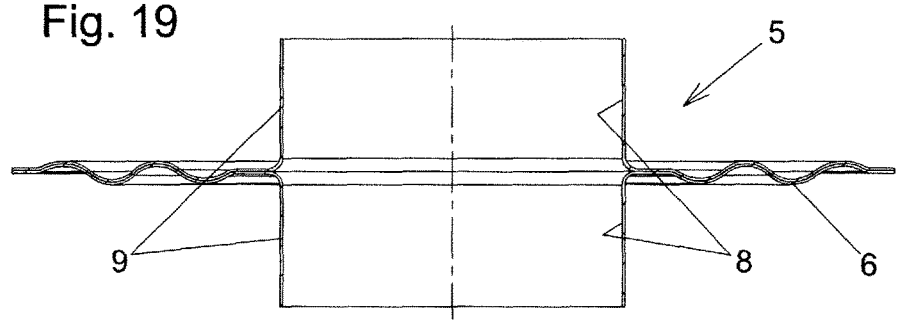

Fig. 20
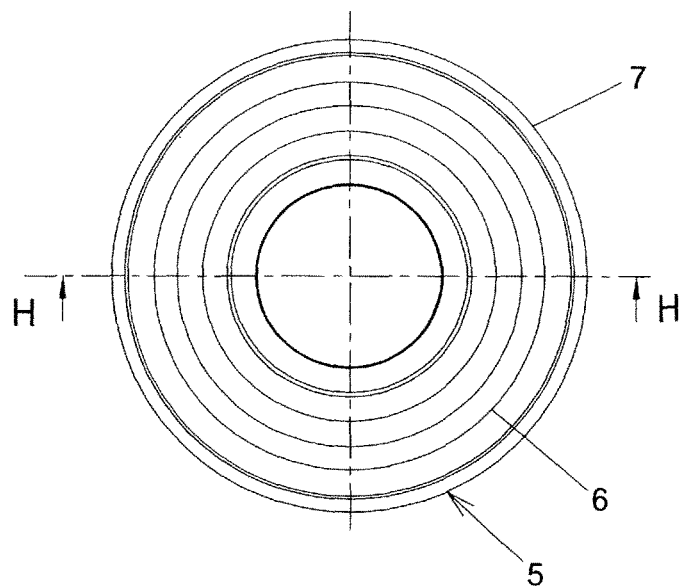
Fig. 22
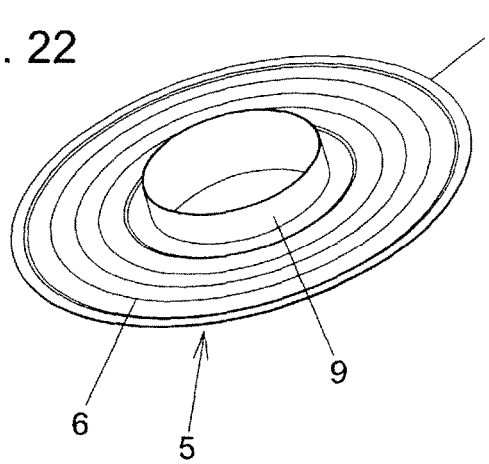
Fig. 23
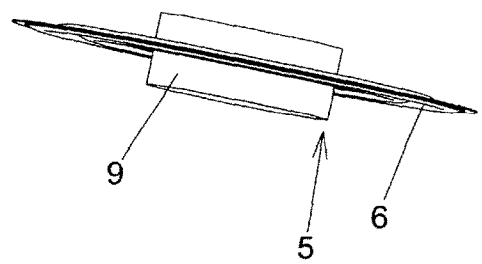
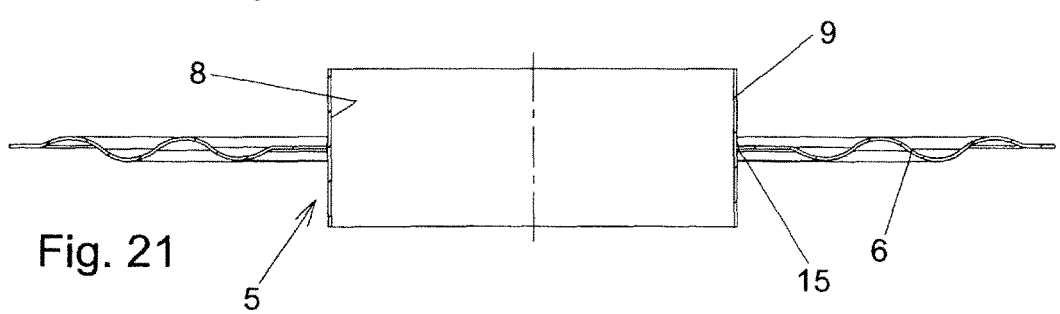
Fig. 21

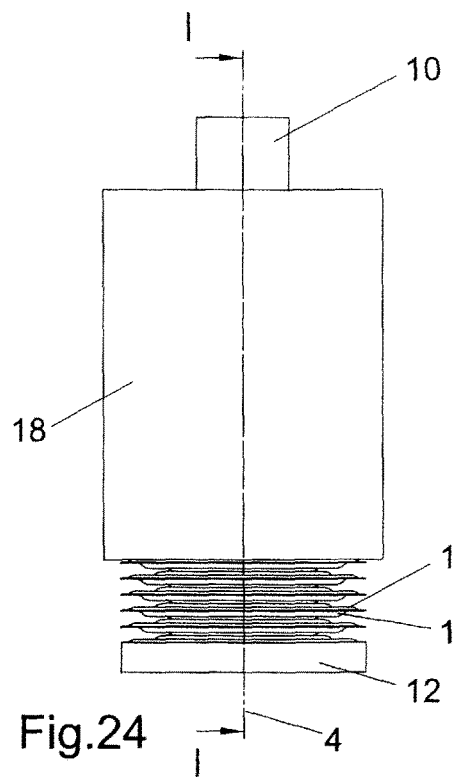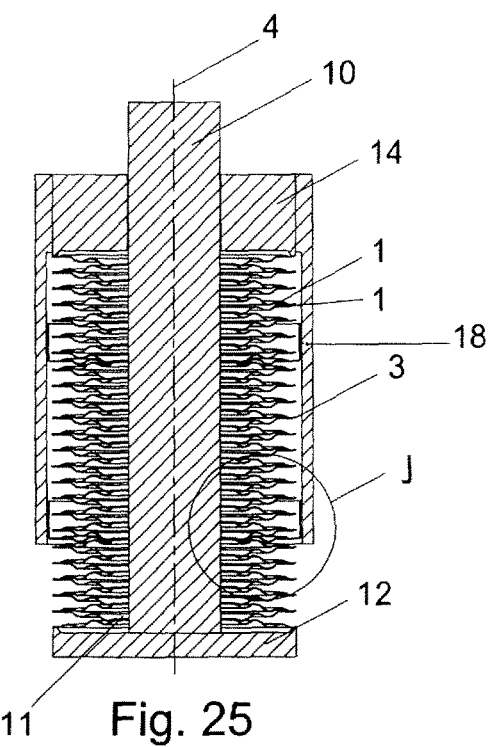
Fig. 24  Fig. 25
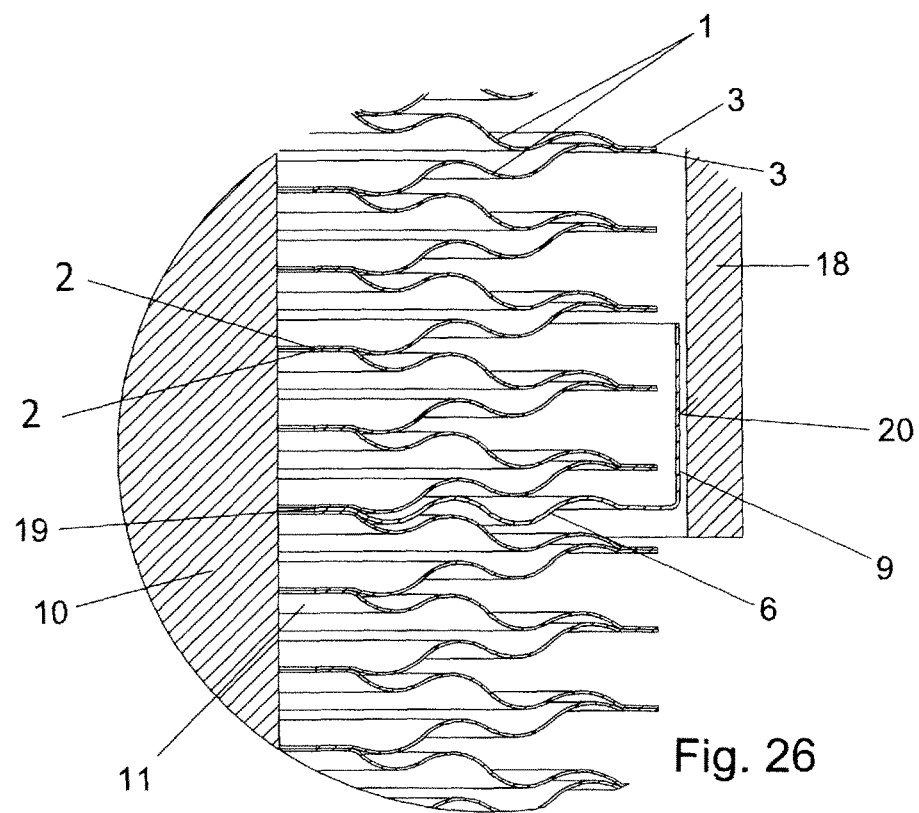
Fig. 26

DIAPHRAGM BELLOWS

INCORPORATION BY REFERENCE

The following documents are incorporated herein by reference as if fully set forth: EP 14 002 715.2, filed Aug. 4, 2014.

BACKGROUND

The invention relates to a diaphragm bellows having a plurality of diaphragms with outer edges and inner edges, diaphragms that follow one another in the direction of the longitudinal center axis of the diaphragm bellows being welded together alternately in the region of their inner edges and in the region of their outer edges, the diaphragm bellows additionally having at least one guide part for guiding on the outer surface of a rod passing through an inner through-opening in the diaphragm bellows. Additionally, the invention relates to a diaphragm bellows having a plurality of diaphragms with outer edges and inner edges, diaphragms that follow one another in the direction of the longitudinal center axis of the diaphragm bellows being welded together alternately in the region of their inner edges and in the region of their outer edges, the diaphragm bellows additionally having at least one guide part for guiding on the inner surface of a tube surrounding the diaphragm bellows.

Diaphragm bellows are generally used as a flexible sealing element in order to separate different pressure regions in an application. Thus, diaphragm bellows are used for example for vacuum leadthroughs of vacuum valves, the diaphragm bellows enclosing the drive rod of the valve and separating the vacuum region from the atmosphere region when the valve is opened and closed. In addition to applications for vacuum leadthroughs for introducing movement into the vacuum, diaphragm bellows can be used for example as compensators for absorbing thermal expansions or assembly tolerances. A further application is, for example, in vibration decoupling in a vacuum system, for example between a vacuum pump and a measuring instrument.

Diaphragm bellows consist of diaphragms that are welded together alternately at their outer and inner edges. During production, first of all diaphragm pairs are welded together at their inner edges and subsequently the diaphragm pairs are arranged alongside one another in a row and are welded together at their outer edges. By way of such diaphragm bellows, travel in an axial and/or lateral and/or angular direction is possible.

In addition to diaphragm bellows, corrugated bellows are known, in which tubes are deformed in a bellows-like manner, with the result that movability is achieved. Specific configurations of corrugated bellows can be gathered for example from U.S. Pat. No. 4,650,160 A and GB 2 062 132 A.

When diaphragm bellows are used, pressure differences usually arise between the interior and the outer side of the diaphragm bellows, it being possible for the pressure inside the diaphragm bellows to be lower or higher than the pressure outside the diaphragm bellows. Due to such pressure differences (in particular when a higher pressure prevails inside the diaphragm bellows than outside the diaphragm bellows) and/or as a result of gravitational force, it is possible, due to the low side rigidity of the diaphragm bellows, for lateral buckling of the diaphragm bellows to occur to a greater or lesser extent when the diaphragm bellows is sufficiently long. For example, as a result, the diaphragm bellows can come to bear against a rod (e.g. drive rod of a vacuum valve), extending through the inner through-opening in the diaphragm bellows, in regions of the welds of the inner edges of the diaphragm. In the event of the rod moving, the inner edges of the diaphragm thus rub against the rod, and this can result in wear to the weld seams between the inner edges of the diaphragms, with the result that the strength of these weld seams can be impaired over time and leaks can occur.

Therefore, guide parts for guiding the diaphragm bellows in the central regions of its longitudinal extent have already been used. A diaphragm bellows of the type mentioned at the beginning can be gathered from US 2002/0175480 A1. This document discloses annular guide parts (=sliding rings) having outwardly protruding protuberances which project into the space between adjacent diaphragms of the diaphragm bellows and fix the guide part in a form-fitting manner with respect to movement in an axial direction of the diaphragm bellows. The inner edges of the two diaphragms, between which each sliding ring is retained, rest against the outer lateral surface of the sliding ring. In the compressed state of the diaphragm bellows, the inner edges of adjacent diaphragms are also arranged over the outer lateral surface of the sliding ring. A particular drawback with such sliding rings is that the diaphragms, between which each sliding ring is retained, cannot be placed against one another. The possible axial travel of the diaphragm bellows is reduced as a result. In addition, such sliding rings have a relatively large mass compared with the diaphragms, and as a result additional dynamic loads on the diaphragms can occur. In the state installed in the vertical direction, different expansion of the diaphragm bellows below and above each sliding ring also occurs as a result of the mass of the sliding rings, and this is amplified in the case of a plurality of sliding rings being used and likewise results in higher loads on the diaphragm bellows.

In the case of the diaphragm bellows known from CN 203 363 518 U, a solid support ring is welded in between two portions of the diaphragm bellows. Similar problems to those described above occur here.

JP 2013221596 A describes a bellows have guide members configured in a scissors-like manner. This is a complicated structure.

It is also known to use diaphragm bellows in implantable infusion pumps for dispensing a medicament. The medicament is located inside the diaphragm bellows, which is closed at its underside by a bottom and at its top side by a base plate of the infusion pump. By way of a pressure acting on the bottom, the diaphragm bellows is compressed and the medicament is dosed. In order to determine the remaining volume of the diaphragm bellows and thus the remaining quantity of medicament, use is made of electronic resonance circuits which comprise a coil in the bottom of the diaphragm bellows. In order to increase the sensitivity of a resonance circuit in order to determine the volume of the diaphragm bellows, an additional central plate of the diaphragm bellows is used in EP 2 177 792 A1, said central plate having at least one opening for the medicament to pass through. In order to fasten the central plate, use is made of a retaining ring having retaining arms which are arranged in a cross shape, which are connected together in a central connecting region, and by way of which the intermediate plate is welded. The retaining ring is located, in the region of its outer edge, between the outer edges of two diaphragms and is welded thereto. A guide that prevents lateral buckling of the diaphragm bellows is not necessary in such a device just because of the shortness of the diaphragm bellows.

SUMMARY

It is the object of the invention to provide an improved diaphragm bellows of the type mentioned at the beginning, in which lateral buckling is counteracted by at least one guide part. This object is achieved by a diaphragm bellows having one or more of the features of the invention.

According to the invention, the guide part is made of sheet metal. According to a first variant of the invention, the diaphragm bellows has at least one guide part having a holding portion which is located, in the region of its outer edge, between adjacent diaphragms of the diaphragm bellows and is welded to said adjacent diaphragms. Starting from its outer edge, the holding portion extends toward the longitudinal center axis of the diaphragm bellows and projects beyond the inner edges of the adjacent diaphragms in a direction toward the longitudinal center axis of the diaphragm bellows and is connected to a guide portion, located closer to the longitudinal center axis of the diaphragm bellows than the inner edges of said adjacent diaphragms, for guiding on the outer surface of a rod passing through the inner through-opening in the diaphragm bellows.

According to a second variant of the invention, the holding portion of the at least one guide part is located, in the region of its inner edge, between adjacent diaphragms of the diaphragm bellows and is welded to said adjacent diaphragms. Starting from its inner edge, the holding portion extends away from the longitudinal center axis of the diaphragm bellows and projects beyond the outer edges of the adjacent diaphragms in a direction away from the longitudinal center axis of the diaphragm bellows and is connected to a guide portion, located farther away from the longitudinal center axis of the diaphragm bellows than the outer edges of said adjacent diaphragms, for guiding on the inner surface of a tube surrounding the diaphragm bellows.

Because the at least one guide part is made of sheet metal, said guide part has a low mass and so, as a result of the diaphragm bellows being configured with one or more such guide parts, no significantly greater loads on the diaphragm bellows occur as a result of the additional mass of the at least one guide part. In addition, at least approximately complete compressibility of the diaphragm bellows is obtained. A diaphragm bellows according to the invention is easy to produce in this connection.

By way of the invention, a diaphragm bellows having a guide that prevents lateral buckling can be provided, said diaphragm bellows having a long service life.

Advantageously, the guide portion extends at least partially in the direction of the longitudinal center axis of the diaphragm bellows. In particular, the guide portion surrounds the longitudinal center axis of the diaphragm bellows in a sleeve-like manner.

The thickness (=material thickness) of the holding portion of the guide part is preferably less than five times, particularly preferably less than three times, the thickness of the diaphragms between which the holding portion of the guide part is arranged. Advantageously, the holding portion is formed by a diaphragm part which has the same thickness as the diaphragms between which it is located, or by two such diaphragm parts resting against one another.

The thickness (=material thickness) of the guide portion of the guide part is preferably less than five times, particularly preferably less than three times, the thickness of the diaphragms between which the holding portion, to which the guide portion is connected, is located. Advantageously, the guide portion can have the same thickness as said diaphragms.

In an advantageous embodiment of the invention, the guide portion is configured integrally with the holding portion. The guide part can in this case be formed advantageously by deep-drawing a sheet metal part. When the holding portion is formed by two diaphragm parts resting against one another, a possible embodiment provides for the guide part to comprise two portions, each of which is configured in a material-integral manner with one of the layers of the holding portion. The guide part can in this case be formed advantageously by deep-drawing two sheet metal pieces which are inserted together between the adjacent diaphragms of the diaphragm bellows and are welded thereto.

In another possible embodiment, the guide portion can be welded to the holding portion. The holding portion can in this case be configured in a tubular manner and be welded to an inner edge of the holding portion formed by a diaphragm part.

The guide portion is advantageously spaced apart from the inner edges of the diaphragms, the distance preferably being at least 3 times the thickness (=material thickness) of the guide portion.

The thickness (=material thickness) of the guide portion is preferably in the range from 0.07 to 0.6 mm, a range from 0.1 to 0.3 mm being particularly preferred.

The thickness (=material thickness) of the holding portion of the guide part is preferably in the range from 0.07 to 0.6 mm, a range from 0.1 to 0.3 mm being particularly preferred.

For example, the at least one guide part is made of steel. It is also possible for it to be made of other metals, for example of a nickel alloy or titanium.

When the terms "inner" and "outer" are used in the context of this document, this relates to the radial position with regard to the longitudinal center axis of the diaphragm bellows, i.e. a part located farther in is at a smaller distance from the longitudinal center axis than a part located farther out.

BRIEF DESCRIPTION OF THE DRAWINGS

Further advantages and details of the invention are explained in the following text with reference to the appended drawing, in which:

FIG. 1 shows a side view of a portion of a diaphragm bellows according to a first exemplary embodiment of the invention;

FIG. 2 shows a section along the line AA in FIG. 1;

FIG. 3 shows a detail B of FIG. 2;

FIGS. 4 and 5 show a plan view and an perspective view of a diaphragm of the diaphragm bellows;

FIG. 6 shows a side view of the diaphragm;

FIG. 7 shows a plan view of a guide part of the diaphragm bellows;

FIG. 8 shows a section along the line CC in FIG. 7;

FIGS. 9 and 10 show perspective views of the guide part from different viewing directions;

FIG. 16 shows an perspective view of the parts in FIG. 14;

FIG. 17 shows a section analogous to FIG. 2 for a second exemplary embodiment of the invention;

FIG. 18 shows a detail G of FIG. 17;

FIG. 19 shows a section analogous to FIG. 8 of the guide part corresponding to the second exemplary embodiment of the invention;

FIG. 20 shows a side view of a guide part of a diaphragm bellows according to a third exemplary embodiment of the invention;

FIG. 21 shows a section along the line HH in FIG. 20;

FIGS. 22 and 23 show oblique views of the guide part from different viewing directions;

FIG. 24 shows a device comprising a diaphragm bellows according to a fourth exemplary embodiment of the invention with connection pieces attached to both sides thereof and a tube surrounding the diaphragm bellows;

FIG. 25 shows a section along the line II in FIG. 24;

FIG. 26 shows an enlarged detail J of FIG. 25.

DETAILED DESCRIPTION OF THE PREFERRED EMBODIMENTS

Figures 11, 12:
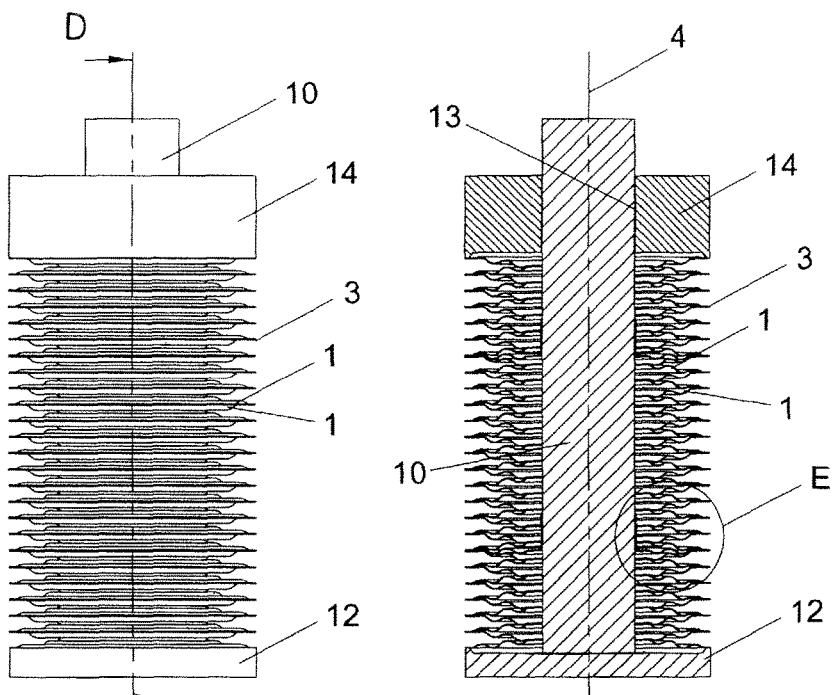
FIG. 11 shows a device comprising a diaphragm bellows according to the first exemplary embodiment of the invention with connection pieces attached to both sides thereof and a rod passing through the inner passage opening in the diaphragm bellows.
FIG. 12 shows a section along the line DD in FIG. 11.

The figures are at different scales. Mutually corresponding or analogous parts are designated by the same reference signs in the various exemplary embodiments.

FIGS. 1 to 10 illustrate a portion of the longitudinal extent of a diaphragm bellows according to the invention according to a first exemplary embodiment. The diaphragm bellows comprises a plurality of diaphragms 1, which can also be referred to as diaphragm disks or annular diaphragms. Each diaphragm has an inner edge 2 and an outer edge 3. The inner and outer edges 2, 3 of the diaphragms have circular shapes. In the exemplary embodiment shown, all of the diaphragms have identical inner edge radii and identical, comparatively larger outer edge radii, as is preferred. The diaphragms are configured in particular in a rotationally symmetrical manner.

Advantageously, the diaphragms 1 are configured so as to be corrugated, without external forces acting thereon, and slightly conical, as is known. The diaphragms 1 are all configured in an identical manner in the exemplary embodiment.

The diaphragms 1 are formed of sheet metal with a thickness which is preferably in the range from 0.07 to 0.3 mm, preferably 0.09 to 0.2 mm.

For example, the diaphragms 1 be formed of sheet steel. It is also possible for them to be made of other metals, for example of a nickel alloy or titanium.

Diaphragms 1 that follow one another in the direction of the longitudinal center axis 4 of the diaphragm bellows are welded together alternately at their inner edges 2 and outer edges 3, resulting in an accordion-like configuration.

The configuration of the diaphragm bellows, as described so far, is known.

In the portion, shown in FIGS. 1 to 3, of the longitudinal extent of the diaphragm bellows, the latter additionally has a guide part 5. This is likewise made of sheet metal. The sheet metal thickness (=material thickness) can correspond to that of the diaphragms 1. Use can also be made of a sheet metal having a different thickness, for example a greater thickness, the thickness then being preferably less than three times as large, particularly preferably less than twice as large, as the thickness of the sheet metal of the diaphragms 1.

The guide part 5 comprises a holding portion 6. The latter is located, in the region of its outer edge, between the outer edge regions of the adjacent diaphragms 1, i.e. diaphragms that follow one another in the direction of the longitudinal center axis 4, of the diaphragm bellows. The outer edges 3, resting against one another, of said adjacent diaphragms 1 of the diaphragm bellows and of the holding portion 6 are welded together. The welds can be configured in an analogous manner to the welds of the other, adjacent diaphragms 1 of the diaphragm bellows that are welded together at their outer edges 3.

Starting from the outer edge 7 of the holding portion 6, which also represents the outer edge of the guide part 5, the holding portion 6 approaches more and more the longitudinal center axis 4 of the diaphragm bellows in a direction toward a guide face 8 of the guide part 5 and in the process projects beyond the inner edges 2 of the diaphragms 1 adjacent to the guide part 5 (and in the exemplary embodiment also all the other diaphragms 1 of the diaphragm bellows) in the direction toward the longitudinal center axis 4.

The guide face 8 surrounds a central opening in the guide part 5. The central opening in the guide part 5 has a diameter which is at least 80% of the diameter of the central openings in the diaphragms 1 located on both sides of the holding portion 6 of the guide part 5.

In the region of the radial extent of the holding portion 6, via which it is located between the successive diaphragms 1 of the diaphragm bellows (with respect to the radial direction), the holding portion 6 has a contour, as seen in the longitudinal central section through the diaphragm bellows (cf. in particular FIGS. 2 and 3), corresponding to the diaphragms 1 such that the diaphragms 1 and the holding portion 6 located between the latter rest extensively against one another in the completely compressed state of the diaphragm bellows.

In the exemplary embodiment, the holding portion 6 has in this case a corrugated profile, as seen in longitudinal central section (cf. in particular FIGS. 2, 3 and 8), wherein the lengths and heights of the corrugations correspond to those of the corrugations of the diaphragms 1.

The holding portion 6 is connected, in its region projecting beyond the inner edges of the (adjacent) diaphragms 1 in the direction of the longitudinal center axis 4, to a guide portion 9 of the guide part 5. The guide portion 9 is thus at a smaller distance from the longitudinal center axis 4 than the inner edges 2 of the diaphragms 1. The guide portion 9 serves to guide the diaphragm bellows on a rod 10, cf. FIGS. 11 to 13 described in more detail below.

The inner surface, directed toward the longitudinal center axis 4, of the guide portion 9, said surface forming the guide surface 8 of the guide part 5 for guiding the diaphragm bellows with respect to the rod 10, is cylindrical in the exemplary embodiment. Thus, the guide part 5 is configured in the form of a cylindrical casing in the exemplary embodiment.

However, configurations other than in the form of a cylindrical casing are conceivable and possible. Thus, the guide portion 9 could be configured in a corrugated manner for example, as seen in the longitudinal central section. Also, the guide portion could in principle have portions that are spaced apart in the circumferential direction around the longitudinal center axis 4, so that it does not form a closed sleeve. A rotationally symmetrical configuration of the guide part 5 is preferred, however.

The guide portion 9 extends favorably at least along a length of 0.5 cm, with respect to the direction of the longitudinal center axis 4.

As seen in longitudinal central section, the guide part 5 has, in this exemplary embodiment, a substantially L-shaped contour ("substantially L-shaped" means here that corrugations of the holding portion 6 and a connection of the holding portion 6 to the guide portion 9—possibly also configured in a corrugated manner—via a curve are provided).

The guide portion 9 is preferably at a distance from the inner edges 2, located in the same region of the longitudinal extent of the longitudinal center axis 4, of the diaphragms 1, said distance being more than five times the sheet metal thickness of the guide portion 9.

In this exemplary embodiment of the invention, the connection between the holding portion 6 and the guide portion 9 is made via a material-integral configuration. The guide part 5 is in this case configured in a material-integral manner overall. In principle, the holding portion 6 and the guide portion 9 could also be parts that are connected together in a cohesive manner, cf. also the third exemplary embodiment described below.

A central plane through the holding portion 6 could be defined such that it is the plane for which the surface integral of the squares of the distances of the points of the holding portion 6 from this plane is at a minimum. Such a central plane of the holding portion 6 preferably encloses an angle of at least 70°, preferably an angle of 90°, with the longitudinal center axis 4.

On moving, as seen in longitudinal central section, from that end of the guide part that is located at the outer edge of the guide part in the direction of the inner end (or, in a different exemplary embodiment, one of the inner ends) of the guide part, the inner end of the holding portion 6 could be defined at the point at which the angle between a tangent applied to the holding portion 6 and the longitudinal center axis 4 becomes less than 45°. The start of the guide portion 9 could be located at the point at which the tangent applied to the guide part 5 is parallel to the longitudinal center axis 4 for the first time. Thus, a short, curved transitional portion would be located between the inner end of the holding portion 6 and the start of the guide portion 9.

The diaphragm bellows will in many applications cases be configured in a longer manner than is illustrated in FIGS. 1 and 2. The configuration and connection of the other diaphragms 1 can in this case be identical to those in the illustrated portion. Depending on the length of the diaphragm bellows, further guide parts 5 may favorably be provided. Guide parts 5 that follow one another in the axial direction are in this case arranged such that they are still spaced apart from one another in the axial direction of the longitudinal center axis 4 even in the fully compressed state of the diaphragm bellows.

End pieces, in particular in the form of standardized flanges, may be welded to the diaphragms 1 located at the two axial ends of the diaphragm bellows.

Figure 13:
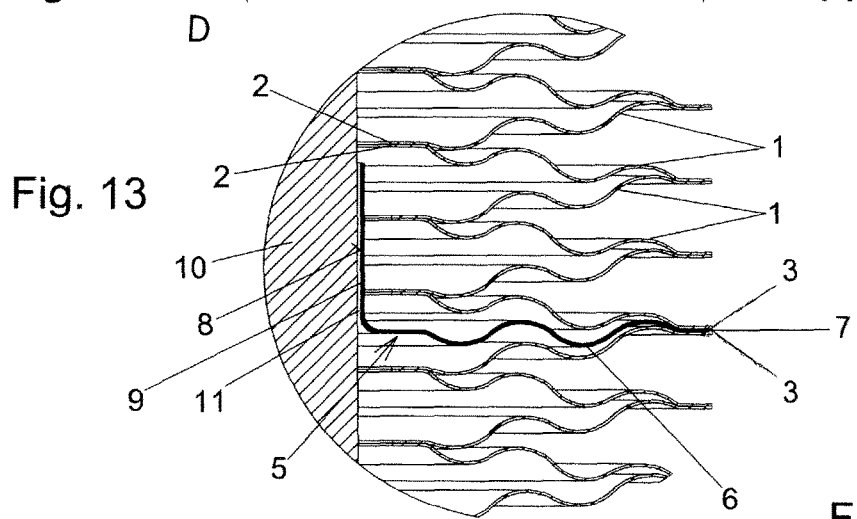
FIG. 13 shows a detail E of FIG. 12.

FIGS. 11 to 13 show the application of a diaphragm bellows according to the first embodiment of the invention for a vacuum leadthrough. The rod 10 passes through the inner through-opening 11 in the diaphragm bellows. At one end, a connection piece 12, which is welded to the outer edge 3 of an end diaphragm 1 of the diaphragm bellows, is mounted on the rod 10. The rod 10 projects, in the direction of its other end, through a passage opening 13 in a further connection piece 14. The outer edge 3 of the other end diaphragm 1 is welded to the connection piece 14. The connection piece 14 may be for example a flange which can be connected in a vacuum-tight manner to another part of a vacuum device, for example a vacuum valve. When easy exchange of the unit having the diaphragm bellows is not desired, this end diaphragm 1 could also be welded directly to a corresponding part of a vacuum device. The connection piece 12 could also be dispensed with and provision could be made of a final diaphragm 1 which is welded by way of its outer edge to the adjacent diaphragm and has an inner edge which projects beyond the inner edges of the other diaphragms in the direction of the longitudinal center axis 4 and is welded directly to the rod 10.

It is apparent from FIG. 12 that the diaphragm bellows shown here has two guide parts 5. The guide portion 9 of each guide part 5 surrounds the rod 10 with a clearance in order to form a sliding guide. Preferably, the clearance is in the range of 0.02 to 1 mm, particularly preferably 0.02 to 0.2 mm.

Figures 14, 15:
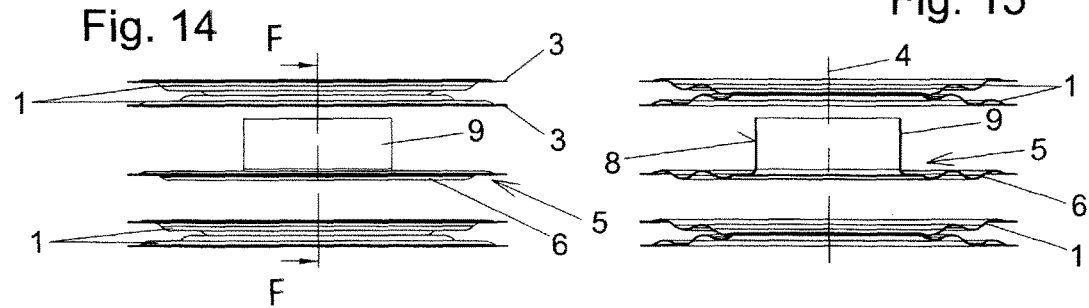
FIG. 14 shows a side view of two diaphragm pairs welded at their inner edges and a guide part arranged therebetween, corresponding to an intermediate stage in the production of the diaphragm bellows.
FIG. 15 shows a section along the line FF in FIG. 14.

In order to produce the diaphragm bellows, pairs of diaphragms 1 that are welded together at their inner edges 2 are first of all formed in a known manner. FIGS. 14 to 16 illustrate two such pairs. In the regions away from the guide parts 5, the pairs thus formed are arranged alongside one another in a row in a known manner and are welded together at their outer edges 7. At the point where a guide part 5 is intended to be arranged in the diaphragm bellows, said guide part is introduced between two such diaphragm pairs, cf. FIGS. 14 to 16. Subsequently, the outer edges of the guide part 5 and of the diaphragms adjacent to the guide part 5 are placed against one another and welded together.

A second exemplary embodiment of the invention is illustrated in FIGS. 17 to 19. The diaphragm bellows according to this second exemplary embodiment corresponds to the diaphragm bellows of the first exemplary embodiment, apart from the differences described in the following text.

The guide part 5 is configured in two parts in this exemplary embodiment. The configuration of the first individual part corresponds to the configuration of the guide part of the first exemplary embodiment. The second individual part is configured in an identical manner to the first individual part in the region of the holding portion 6. However, that part of the guide portion that is formed by the second individual part extends in the opposite axial direction to that part of the guide portion that is formed by the first individual part. The two individual parts are placed against one another such that they rest extensively against one another in the region of the holding portion 6 and together form the holding portion 6 of the guide part 9. They can be welded together in this region in this case. The guide part 5 thus formed is inserted between two diaphragms 1 in an analogous manner to the description given for the first exemplary embodiment, and the outer edges 3, 7 of the diaphragms 1 and of the guide part 5 are welded together.

A third exemplary embodiment is explained in the following text with reference to FIGS. 20 to 23. Apart from the differences described in the following text, the configuration of the third exemplary embodiment corresponds to that of the first exemplary embodiment.

The difference is again in the configuration of the guide part 5. The holding portion 6 and the guide portion 9 are formed in this case by separate parts which are welded together. The holding portion 6 corresponds, in terms of its contour, substantially to the holding portion of the guide part of the first exemplary embodiment and is welded at its inner edge to the guide portion 9, which is formed here by a part that is configured in a sleeve-like manner and could also be referred to as a "thin-walled tube piece". The weld 15, which is indicated in FIG. 21, is advantageously provided in an axially central region of this part.

FIGS. 24 to 26 show a device which has a fourth exemplary embodiment of a diaphragm bellows according to the invention. Also illustrated are connection pieces 12, 14 welded to the two ends of the diaphragm bellows and a tube 18 which surrounds the diaphragm bellows and via which the diaphragm bellows is guided in order to prevent lateral buckling of the diaphragm bellows.

Apart from the differences described in the following text, the configuration of the diaphragm bellows corresponds to that of the first exemplary embodiment.

The guide portion 9 of each guide part 5 is located here on the outer side of the diaphragm bellows and the outer surface of the guide portion forms a guide face 8 of the guide part 5, said guide face 8 interacting with the inner wall of the surrounding tube 18. The guide portion 9 is connected to a holding portion 6. The inner edge 19 of the holding portion 6, which at the same time forms the inner edge of the guide part 5, is located between the inner edges 2 of the two diaphragms 1 adjacent to the guide part 5, and the inner edges 2, 19 of these diaphragms 1 and the guide part 5 located in between are welded together. Starting from its inner edge 19, at which it is welded to the inner edges 2 of the adjacent diaphragms 1, the holding portion 6 extends away from the longitudinal center axis 4 in a direction toward the guide face 20 of the guide part 5, and projects beyond the outer edges 3 of the adjacent diaphragms 1 in a direction away from the longitudinal center axis 4 of the diaphragm bellows. The holding portion 6 is in this case connected to the guide portion 9 that is located farther away from the longitudinal center axis 4 of the diaphragm bellows than the outer edges 3 of the diaphragms 1.

The tube 18 surrounds the guide portions 9 of the guide parts 5 in each case with a clearance in order to form a sliding guide between each guide portion 9 and the tube 18. Preferably, the clearance is in the range of 0.02 mm to 1 mm, particularly preferably 0.02 mm to 0.2 mm.

In this variant embodiment of the invention, too, in which guiding takes place on the inner surface of a tube 18 surrounding the diaphragm bellows, various modifications of the guide part 5 are conceivable and possible, for example analogously to the above-described modifications according to the second and third embodiments.

The tube 18 is attached to the connection piece 14 in the exemplary embodiment shown in FIGS. 24 to 26, but could also be fixed in some other way.

The exemplary embodiment illustrated in FIGS. 24 to 26 serves again as a vacuum leadthrough for transferring a movement of a rod 10, which passes through the inner through-opening 11 in the diaphragm bellows, into a vacuum region. The rod 10 is in this case connected to the connection piece 12, although the connection piece 12 could again be dispensed with and the diaphragm bellows could be welded directly to the rod 10.

In other exemplary embodiments, the rod 10 could also be dispensed with and the through-opening 11 could be provided for example as a connection between two vacuum chambers, for example for the passage of articles. The guide on the tube 18 in this case prevents the diaphragm bellows from buckling.

KEY TO THE REFERENCE SIGNS

1 Diaphragm
2 Inner edge
3 Outer edge
4 Longitudinal center axis
5 Guide part
6 Holding part
7 Outer edge
8 Guide face
9 Guide portion
10 Rod
11 Through-opening
12 Connection piece
13 Passage opening
14 Connection piece
15 Weld
18 Tube
19 Inner edge
20 Guide face

The invention claimed is:

1. A diaphragm bellows comprising a plurality of diaphragms with outer edges and inner edges, said diaphragms follow one another in an axial direction of a longitudinal center axis of the diaphragm bellows and are welded together alternately in a region of said inner edges and in a region of said outer edges and first and second end diaphragms form first and second ends of the diaphragm bellows, and at least one guide part adapted for guiding on an outer surface of a rod passing through an inner through-opening in the diaphragm bellows, the at least one guide part is made of sheet metal and includes a holding portion which is located, in a region of an outer edge thereof, between adjacent ones of the diaphragms and is welded to said adjacent diaphragms only in the outer edge region and, starting from the outer edge of the holding portion, extends toward the longitudinal center axis of the diaphragm bellows and projects beyond the inner edges of said adjacent diaphragms in a direction toward the longitudinal center axis of the diaphragm bellows and is connected to a guide portion, located closer to the longitudinal center axis of the diaphragm bellows than the inner edges of said adjacent diaphragms, adapted for guiding on the outer surface of the rod passing through the inner through-opening in the diaphragm bellows, and the guide portion surrounds the longitudinal center axis as a sleeve, wherein the holding portion as well as the guide portion are located, with respect to the axial direction, between the first and second end diaphragms and are axially distanced from the first and second ends of the diaphragm bellows.

2. The diaphragm bellows as claimed in claim 1, wherein a thickness of the holding portion of the guide part is less than five times a thickness of the diaphragms between which the holding portion of the guide part is arranged.

3. The diaphragm bellows as claimed in claim 2, wherein the thickness of the holding portion of the guide part is less than three times the thickness of the diaphragms between which the holding portion of the guide part is arranged.

4. The diaphragm bellows as claimed in claim 1, wherein a thickness of the guide portion of the guide part is less than five times a thickness of the diaphragms between which the holding portion of the guide part, to which the guide portion is connected, is arranged.

5. The diaphragm bellows as claimed in claim 4, wherein the thickness of the guide portion of the guide part is less than three times the thickness of the diaphragms between which the holding portion of the guide part, to which the guide portion is connected, is arranged.

6. The diaphragm bellows as claimed in claim 1, wherein the guide portion is configured in a material-integral manner with the holding portion or with at least an individual part of the holding portion, or is cohesively connected to the holding portion.

7. The diaphragm bellows as claimed in claim 1, wherein the diaphragms, located on both sides of the holding portion of the guide part, and the holding portion rest against one another in a completely compressed state of the diaphragm bellows.

8. The diaphragm bellows as claimed in claim 1, wherein the guide portion of the guide part has a central opening of which a diameter is at least 80% of a diameter of central openings in the diaphragms located on both sides of the holding portion of the guide part.

9. The diaphragm bellows as claimed in claim 1, wherein the diaphragm bellows has at least two guide parts.

10. The diaphragm bellows as claimed in claim 9, wherein the guide parts that follow one another in the axial direction of the longitudinal center axis of the diaphragm bellows are spaced apart from one another in the axial direction of the longitudinal center axis even in a completely compressed state of the diaphragm bellows.

11. The diaphragm bellows as claimed in claim 1, wherein the guide portion extends axially inside a plurality of the diaphragms.

12. A diaphragm bellows comprising a plurality of diaphragms with outer edges and inner edges, said diaphragms follow one another in an axial direction of a longitudinal center axis of the diaphragm bellows and are welded together alternately in a region of said inner edges and in a region of said outer edges and first and second end diaphragms form first and second ends of the diaphragm bellows, and at least one guide part adapted for guiding on an inner surface of a tube surrounding the diaphragm bellows, the at least one guide part is made of sheet metal and includes a holding portion which is located, in a region of an inner edge thereof, between adjacent ones of the diaphragms and is welded to said adjacent diaphragms only in the region of the inner edge and, starting from an inner edge of the holding part, extends away from the longitudinal center axis of the diaphragm bellows and projects beyond the outer edges of said adjacent diaphragms in a direction away from the longitudinal center axis of the diaphragm bellows and is connected to a guide portion, located farther away from the longitudinal center axis of the diaphragm bellows than the outer edges of said adjacent diaphragms, adapted for guiding on the inner surface of the tube surrounding the diaphragm bellows, and the guide portion surrounds the longitudinal center axis as a sleeve, wherein the holding portion as well as the guide portion are located, with respect to the axial direction, between the first and second end diaphragms and are axially distanced from the first and second ends of the diaphragm bellows.

13. The diaphragm bellows as claimed in claim 12, wherein a thickness of the holding portion of the guide part is less than five times a thickness of the diaphragms between which the holding portion of the guide part is arranged.

14. The diaphragm bellows as claimed in claim 12, wherein a thickness of the guide portion of the guide part is less than five times a thickness of the diaphragms between which the holding portion of the guide part, to which the guide portion is connected, is arranged.

15. The diaphragm bellows as claimed in claim 12, wherein the guide portion is configured in a material-integral manner with the holding portion or with at least an individual part of the holding portion, or is cohesively connected to the holding portion.

16. The diaphragm bellows as claimed in claim 12, wherein the diaphragms, located on both sides of the holding portion of the guide part, and the holding portion rest against one another in a completely compressed state of the diaphragm bellows.

17. The diaphragm bellows as claimed in claim 12, wherein the diaphragm bellows has at least two guide parts.

18. The diaphragm bellows as claimed in claim 17, wherein the guide parts that follow one another in the axial direction of the longitudinal center axis of the diaphragm bellows are spaced apart from one another in the axial direction of the longitudinal center axis even in a completely compressed state of the diaphragm bellows.

19. The diaphragm bellows as claimed in claim 12, wherein the guide portion extends axially outside of a plurality of the diaphragms.

20. An arrangement comprising a diaphragm bellows having an inner through-opening and a rod passing through the inner through-opening in the diaphragm bellows, the diaphragm bellows comprising a plurality of diaphragms with outer edges and inner edges, said diaphragms that follow one another in an axial direction of the longitudinal center axis of the diaphragm bellows being welded together alternately in a region of said inner edges and in a region of said outer edges and first and second end diaphragms form first and second ends of the diaphragm bellows, and at least one guide part that guides the diaphragm bellows on an outer surface of the rod which passes through the inner through-opening in the diaphragm bellows, the at least one guide part is made of sheet metal and has a holding portion which is located, in a region of an outer edge thereof, between adjacent ones of the diaphragms and is welded to said adjacent diaphragms only in the outer edge region and, starting from the outer edge of the holding portion, extends toward the longitudinal center axis of the diaphragm bellows and projects beyond the inner edges of said adjacent diaphragms in a direction toward the longitudinal center axis of the diaphragm bellows and is connected to a guide portion, located closer to the longitudinal center axis of the diaphragm bellows than the inner edges of said adjacent diaphragms, that guides the diaphragm bellows on the outer surface of the rod, and the guide portion surrounds the longitudinal center axis as a sleeve, wherein the holding portion as well as the guide portion are located, with respect to the axial direction, between the first and second end diaphragms and are axially distanced from the first and second ends of the diaphragm bellows.

21. The arrangement as claimed in claim 20, wherein the guide portion of the at least one guide part surrounds the rod with a clearance in a range from 0.02 mm to 1 mm, in order to form a sliding guide for the guide portion with respect to the rod.

22. An arrangement comprising a diaphragm bellows and a tube, surrounding the diaphragm bellows, having an inner surface, the diaphragm bellows comprising a plurality of diaphragms that follow one another in an axial direction of a longitudinal center axis of the diaphragm bellows that are welded together alternately in a region of inner edges thereof and in a region of outer edges thereof and first and second end diaphragms form first and second ends of the diaphragm bellows, and at least one guide part for guiding the diaphragm bellows on the inner surface of the tube surrounding the diaphragm bellows, the at least one guide part is made of sheet metal and has a holding portion which is located, in a region of an inner edge thereof, between adjacent ones of the diaphragms of the diaphragm bellows and is welded to said adjacent diaphragms only in the region of the inner edge and, starting from the inner edge of the holding portion, extends away from the longitudinal center axis of the diaphragm bellows and projects beyond the outer edges of said adjacent diaphragms in a direction away from the longitudinal center axis of the diaphragm bellows and is connected to a guide portion, located farther away from the longitudinal center axis of the diaphragm bellows than the outer edges of said adjacent diaphragms, for guiding the diaphragm bellows on an inner surface of the tube, and the guide portion surrounds the longitudinal center axis as a sleeve, wherein the holding portion as well as the guide portion are located, with respect to the axial direction, between the first and second end diaphragms and are axially distanced from the first and second ends of the diaphragm bellows.

23. The arrangement as claimed in claim 22, wherein the tube surrounds the guide portion of the at least one guide part with a clearance in a range from 0.02 mm to 1 mm, in order to form a sliding guide for the guide portion with respect to the tube.

\* \* \* \* \*